US010589394B2

(12) United States Patent
Wanner et al.

(10) Patent No.: US 10,589,394 B2
(45) Date of Patent: Mar. 17, 2020

(54) METHOD AND ARRANGEMENT OF INTRODUCING BOREHOLES INTO A SURFACE OF A WORKPIECE MOUNTED IN A STATIONARY MANNER USING A BORING TOOL ATTACHED TO AN ARTICULATED-ARM ROBOT

(71) Applicant: Fraunhofer-Gesellschaft zur Foerderung der angewandten Forschung e.V., Munich (DE)

(72) Inventors: Martin Christoph Wanner, Nienhagen (DE); Steffen Dryba, Kritzmow (DE); Mirko Gruendler, Rostock (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/579,560

(22) PCT Filed: May 25, 2016

(86) PCT No.: PCT/EP2016/061785
§ 371 (c)(1),
(2) Date: Dec. 4, 2017

(87) PCT Pub. No.: WO2016/193090
PCT Pub. Date: Dec. 8, 2016

(65) Prior Publication Data
US 2018/0169813 A1 Jun. 21, 2018

(30) Foreign Application Priority Data

Jun. 3, 2015 (DE) .................. 10 2015 210 255

(51) Int. Cl.
*B23Q 15/22* (2006.01)
*B23B 41/00* (2006.01)
(Continued)

(52) U.S. Cl.
CPC .............. *B23Q 15/22* (2013.01); *B23B 35/00* (2013.01); *B23B 39/08* (2013.01); *B23B 41/00* (2013.01);
(Continued)

(58) Field of Classification Search
CPC ........ B23Q 15/22; B23Q 15/14; B23Q 15/00; B23Q 16/005; B23Q 17/2233;
(Continued)

(56) References Cited

U.S. PATENT DOCUMENTS 4,337,566 A 7/1982 DiMatteo et al.
4,496,279 A 1/1985 Langer et al.
(Continued)

FOREIGN PATENT DOCUMENTS

DE 10 2010 007 591 A1 8/2011
DE 10 2013 018857 A1 5/2015
(Continued)

OTHER PUBLICATIONS

English translation of DE 102010007591 (Year: 2011).*
International Search Report for PCT/EP2016/061785 dated Aug. 24, 2016; English translation submitted herewith (10 pages).

*Primary Examiner* — Alan Snyder
(74) *Attorney, Agent, or Firm* — Fitch, Even, Tabin & Flannery LLP

(57) ABSTRACT

The invention relates to a method and an arrangement for introducing boreholes into a surface of a workpiece (W) mounted in a stationary manner using a boring tool which is attached to the end face of an articulated-arm robot (KR) and which can be spatially positioned by said robot. The method has the following method steps: —positioning the articulated-arm robot-guided boring tool at a spatial position which lies opposite a specified machining location on the workpiece surface at a specified distance therefrom, —pro-
(Continued)

ducing a rigid mechanical connection which supports the end face of the articulated-arm robot (KR) on the workpiece and which can be released from the workpiece surface, and —machining the surface by moving the boring tool towards the machining location and subsequently engaging the boring tool with the workpiece (W) at the machining location on the workpiece surface while the end face of the articulated-arm robot (KR) is connected to the workpiece. The invention is characterized by the combination of the following method steps: the boring tool is moved towards the workpiece (W) by means of an NC advancing unit attached to the end face of the articulated-arm robot (KR), the boring process is monitored on the basis of information obtained using a sensor system which detects the position of the boring tool relative to the workpiece surface and which is attached to the end face of the articulated-arm robot (KR), and the boring process is terminated upon reaching a specified boring depth.

20 Claims, 6 Drawing Sheets

(51) Int. Cl.
| | | |
|---|---|---|
| B25J 15/00 | (2006.01) | |
| B25J 11/00 | (2006.01) | |
| B25J 15/06 | (2006.01) | |
| B23Q 15/00 | (2006.01) | |
| B23Q 17/22 | (2006.01) | |
| B23B 35/00 | (2006.01) | |
| B23B 39/08 | (2006.01) | |
| B23Q 3/08 | (2006.01) | |

(52) U.S. Cl.
CPC ......... *B23Q 15/00* (2013.01); *B23Q 17/2233* (2013.01); *B23Q 17/2241* (2013.01); *B25J 11/005* (2013.01); *B25J 15/0019* (2013.01); *B25J 15/0095* (2013.01); *B25J 15/0608* (2013.01); *B25J 15/0616* (2013.01); *B23B 2215/76* (2013.01); *B23B 2215/81* (2013.01); *B23Q 3/088* (2013.01); *Y10S 901/09* (2013.01); *Y10S 901/40* (2013.01); *Y10S 901/41* (2013.01); *Y10S 901/47* (2013.01)

(58) Field of Classification Search
CPC ....... B23Q 17/22; B23Q 3/088; Y10S 901/40; B23B 41/16; B23B 2215/76; B23B 2215/81
See application file for complete search history.

(56) References Cited

U.S. PATENT DOCUMENTS

| | | | |
|---|---|---|---|
| 5,613,810 A | * | 3/1997 | Bureller ................ B23Q 15/12 408/11 |
| 2003/0120377 A1 | | 6/2003 | Hooke et al. |
| 2008/0277953 A1 | | 11/2008 | Condliff |
| 2012/0138323 A1 | | 6/2012 | Nicholson |
| 2016/0288320 A1 | | 10/2016 | Wanner et al. |

FOREIGN PATENT DOCUMENTS

| | | | |
|---|---|---|---|
| EP | 1 988 438 A2 | 11/2008 | |
| JP | 2000-296421 A | 10/2000 | |
| WO | 84/02301 A1 | 6/1984 | |
| WO | 2004/028755 A1 | 4/2004 | |
| WO | WO-2009117836 A1 * | 10/2009 | ......... A61B 17/1626 |

* cited by examiner

METHOD AND ARRANGEMENT OF INTRODUCING BOREHOLES INTO A SURFACE OF A WORKPIECE MOUNTED IN A STATIONARY MANNER USING A BORING TOOL ATTACHED TO AN ARTICULATED-ARM ROBOT

CROSS REFERENCE TO RELATED APPLICATIONS

Reference is made to International Application No. PCT/EP2016/061785 filed May 25, 2016, and German Application No. 102015210255.6 filed Jun. 3, 2015, which are incorporated herein by reference in their entirety.

BACKGROUND OF THE INVENTION

Field of the Invention

The invention relates to a method and an arrangement for introducing boreholes, preferably in the form of blind holes, very accurately into a surface of a workpiece mounted in a stationary manner and having any shape using a boring tool which is attached to the end face of an articulated-arm robot and which can be spatially positioned by the robot.

Description of the Prior Art

Articulated-arm robots are widely used, versatile industrial robots, the kinematics for which is constructed from a plurality of arm members connected to each other in an articulated manner to guide and position end effectors such as tools for purposes of processing a workpiece. Of the many possible configurations of robots of such kind, those equipped with serial kinematics have the greatest mobility and flexibility, with each arm member being connected in series to another arm member.

Publication WO 84/02301 describes a typical so-called six-axis vertical articulated-arm robot. The first arm element is pivotably attached to the end on one side of a base, which is mounted to rotate about a first axis, corresponding to machine tools. Consequently, the use of industrial robots of such kind for purposes of machining workpieces is difficult, since the reaction forces and moments received during the machining process cause vibrations throughout the entire kinematic chain of the robot. Consequently, limitations in terms of machining speeds and also machining accuracies arise. Besides the disadvantage regarding low rigidity described above, very long kinematic chains also have low absolute accuracy, which in turn makes drilling highly accurate boreholes even more difficult. But robots can be implemented more flexible and at the same time less expensively than machine tools, resulting in a need for a way to remedy the problem stated above.

Publication DE 10 2010 007 591 A1 describes a working apparatus with robot on a displaceable platform. A working robot having a machining tool attached to the end thereof can be positioned individually on a workpiece. Optical positioning aids serve to ensure exact orientation of the robot and also of the tool relative to the workpiece. However, compact, chassis-propelled robot systems are not suitable for high-precision, cost-efficient machining of large-scale workpieces with dimensions of several meters, since the time required for each repositioning operation is unnecessarily long.

SUMMARY OF THE INVENTION

The invention is a design, a method and an arrangement for introducing boreholes, preferably in the form of blind holes, very accurately into a workpiece surface of any shape which is mounted in a stationary manner using a boring tool that is attached to the end of an articulated-arm robot. The boring tool can be spatially positioned by the robot, so to enable the fastest, most precise positioning possible of the boring tool which being guided by the articulated-arm robot relative to a workpiece to be machined. The workpiece surface to be machined is mainly of freeform surfaces. On the other hand, the machining of the workpiece using the boring tool which is attached to the articulated-arm robot must also satisfy the most stringent machining requirements in terms of both quality and dimensional accuracy and, most particularly on workpieces for machining whose spatial dimensions are equal to and even exceed those of the articulated-arm robot.

The invention is based on provision of additional mechanical support on the workpiece to the kinematic chain of the preferably vertical articulated-arm robot, which depending on the size and construction of the articulated-arm robot may have a robot arm or kinematic chain operating range of several meters, that is it typically extends from 2 to about 10 m, at least while the boring tool is in the process of engaging with the workpiece, thus stabilizing the articulated-arm robot. The mechanical support is assured by a mechanical connection between the end of the articulated-arm robot to which the boring tool is attached and the workpiece. The mechanical connection is established after a predefined position of the robot and orientation of the boring tool relative to the workpiece are reached. The correct positioning and orientation of the boring tool guided by the articulated-arm robot relative to the workpiece is detected and optionally is corrected again by a laser tracking system until the boring tool is positioned with the highest degree of precision. Due to the support for the kinematic chain at the end face in addition to the engagement by the tool while the surface of the workpiece is being machined, forces and moments that are generated by the machining are much less able to induce vibration throughout the articulated-arm robot. Thus the invention enables significant improvement to the quality and also the speed with which the drilling operation can be carried out. The reduction of vibration may advantageously be enhanced with a suitably selected elastic or resilient design of the mechanical connection between the articulated-arm robot and the workpiece.

With the mechanical support at the end of the kinematic chain of the articulated-arm robot on the workpiece itself, the articulated-arm robot forms a mechanical system which is rigid on two sides, that is on one side the articulated-arm robot is clamped firmly to the robot base, and on the other side the articulated arm robot is fixed on the workpiece via the detachable, rigid mechanical connection according to the invention. The contact of the mechanical connection with the workpiece may range from a simple, loose surface or frictional connection created by the force of the robot to an actively adhesive surface bond, in which pneumatically or magnetically generated holding forces assist in creating a detachable rigid connection of the mechanical connection to the workpiece.

To achieve the most stable, vibrationless mounting possible of the kinematic chain of the articulated-arm robot while the surface is being machined, it is advisable to ensure that the workpiece is mounted in a stationary, stable manner. Depending on the size, weight and structure of the workpiece to be machined, it is important to implement appropriate measures for mounting the workpiece in stable manner, so that the force and load moments acting on the workpiece which are engendered by the articulated-arm robot while the surface is being machined can be completely absorbed thereby. The objective is to either mount the workpiece in stable manner with the aid of appropriate holding and/or fixing measures, or to ensure that the workpiece has sufficient inertial mass so that the weight force thereof guarantees an inherently stable stationary mounting even while the surface is being machined.

The method according to the invention and the associated arrangement are ideally suited for machining very large, very heavy workpieces, for example workpieces such as are encountered in aircraft construction or shipbuilding. For example, it is necessary to perform corresponding surface machining activities on aeroplane fuselage shells or on ships' screws or propellers for driving large ships, for example, large container ships. Ships' propellers of such kind have a propeller diameter of several meters, typically between 4 m and 12 m, and a dead weight that would undoubtedly be sufficient to meet the requirements explained previously with respect to a stationary, stable mounting for purposes of machining surfaces using a boring tool guided by an articulated-arm robot.

If it is necessary to introduce boreholes at precisely defined machining locations with defined borehole depths in a large workpiece, at least part of the surface of which consists of a freeform surface, without lifting or turning the ship's propeller, a vertical articulated-arm robot may be considered particularly well suited to carrying out such a workpiece machining task, since articulated-arm robots for guiding the tools can be built with correspondingly large dimensions. A preferred articulated-arm robot equipped with two arm members that are connected to each other by a pivoting articulation, and of which each arm member may have an arm length of up to five metres, is described in DE 10 2013 018 857 A1. This known vertical articulated-arm robot has been specially designed to implement and perform the method according to the invention, so that for purposes of questions relating to the design of the robot system that guides and spatially positions the tool, reference is made to the contents of the disclosure of the aforementioned document in its entirety.

In order to carry out the drilling operation according to the invention on a stationary mounted workpiece, of a ship's propeller as described earlier, for example, using a boring tool which is attached to an end face of an articulated-arm robot and can be spatially positioned thereby, the following method steps must be performed. First, the boring tool guided by the articulated-arm robot is positioned in a spatial position relative to the workpiece opposite a predetermined machining location on the workpiece surface and at a definable distance therefrom. For this purpose, the articulated-arm robot as well as the workpiece to be machined must be mounted relative to each other in a manner that guarantees that the boring tool guided by the articulated-arm robot is able to reach the respectively specified machining locations on the workpiece surface.

After corresponding positioning of the boring tool guided by the articulated-arm robot, which is carried out with process monitoring as will be explained hereinafter, according to the invention a detachable rigid mechanical connection is created between the workpiece surface and the articulated-arm robot, which results in a rigid clamping of one side of the end face of the articulated-arm robot with respect to the workpiece.

In a subsequent process, the surface machining is carried out by moving the boring tool towards the machining location followed by engagement of the boring tool with the workpiece at the machining location while the end face of the articulated-arm robot is connected to the workpiece.

After boring is completed, the mechanical connection is released, and the boring tool is guided by the articulated-arm robot to move away from the machining location and optionally moves to a new position opposite the workpiece.

In order to carry out the method according to the invention, the articulated-arm robot is equipped with a control unit for spatial positioning and orientation of the boring tool attached to the articulated-arm robot, so that a rapid movement of the boring tool guided by the articulated-arm robot to the spatial position opposite and at a distance from the machining location is only possible with the aid of the articulated-arm robot's inbuilt robot kinematics.

The fast positioning and approaching operation is preferably carried out with awareness of a binary data set that describes the spatial shape of the workpiece to be machined, the predetermined machining location on the workpiece surface, and a tool center point assigned to the boring tool, wherein the relative spatial positions of the boring tool guided by the articulated-arm robot and of the predetermined machining location on the workpiece surface are detected and monitored by measurement. A contactless tracking system, for example a laser tracking system, is used to measure the relative spatial positions of the workpiece and the boring tool guided by the articulated-arm robot. This tracking system generates with extreme precision at least one workpiece coordinate system (WKS) which describes the spatial location of the workpiece and one robot coordinate system (RKS) which describes the spatial location of the robot, wherein both coordinate systems are spatially correlated with each other.

In addition, a distance sensor system, which preferably functions without contact, is located in the end region of the kinematic chain of the articulated-arm robot, and detects the distance between the boring tool guided by the articulated-arm robot and the machining location on the workpiece. Besides detecting exact distances, the distance sensor system is preferably also able to detect the spatial position of the boring tool relative to the workpiece surface in the region of the machining location. This enables the spatial position relative to the workpiece surface of the boring tool which is attached to the end of the articulated-arm robot and guided thereby to the spatial orientation to be checked and corrected if necessary, so that the boring tool is able to take up a definable target orientation at the spatial position autonomously. The orientation checking of the boring tool spatial position may also be carried out or at least supported additionally or alternatively on the basis of the spatial and orientation information collected with the laser tracking system. Moreover, deviations from the target orientation induced by the machining process while the surface is being machined may also be detected with the existing sensor system and used for purposes of re-adjusting orientation and/or evaluating the drilling process. Thus, for example the borehole depth of a robot-guided drill may be deduced from the sensor signals.

Besides, the contactless distance sensor system, preferably in the form of three separately attached laser trackers, a mechanical connector, preferably in in the form of at least one linear actuator is attached to the end of the robot arm to form a detachable rigid mechanical connection supporting the articulated-arm robot on one side on the workpiece. The at least one linear actuator, which is preferably constructed with telescoping action, has a locking arrangement arranged to face the workpiece. The locking arrangement is designed to bear as extensively as possible against the workpiece surface. In a first embodiment, the locking arrangement only contacts the workpiece surface under a force load produced by a pressing force that can be generated solely by the articulated-arm robot to create a purely mechanical frictional locking connection. In a preferred, further embodiment, an additional adhesion force is able to fix the locking arrangement of the at least one linear actuator on the workpiece surface. A controllable magnetic or pneumatic force unit is suitable for generating the additional adhesion force. As discussed subsequently with reference to a specific exemplary embodiment, it is particularly advantageous to create the mechanical connection between the articulated-arm robot and the workpiece using three separate linear actuators, which can be activated and deflected independently of each other, thus enabling stable placement of the end face of the robot arm in terms of orientation relative to the workpiece, in particular reliably preventing lateral drift or slippage of the robot kinematics relative to the workpiece surface.

Particularly when machining large-scale workpieces, such as ships' propellers, aircraft parts etc., it has been found that the workpiece may be prone to deformations and/or orientation shifts due to recoiling by the workpiece mounting under the load of the pressing force from the mechanical connector attached to the end of the robot arm, and this may ultimately result in incorrect positioning of the boring tool relative to the intended positions of the boreholes on the workpiece. To prevent such faulty deviations, preferred variant method provides that the connector on the articulated-arm robot is placed on a representative surface region of the workpiece or close to the boring position under a force load before a drilling procedure is carried out on the workpiece, for the purpose of determining whether and to what degree such a force-induced positioning error of the workpiece occurs. An exact spatial measurement of the workpiece is then carried out using the laser tracking system, wherein the exact spatial coordinates are calculated with the aid of preferably three measurement markings attached to different surface areas of the workpiece which can be detected by the laser tracking system. Based on the scan of the exact orientation of the workpiece while the articulated-arm robot bears on the workpiece under a load force, a possible deviation between the borehole position on the workpiece and the boring tool attached to the robot may be detected by the laser tracking system. For corrective purposes, the articulated-arm robot, with the connector attached to the end thereof, is repositioned with respect to the workpiece taking into account the calculated orientation correction, so that the drilling process can begin.

This operating method is considered particularly advantageous in this respect because it is possible in this way not only to capture orientation shifts of the part of the workpiece before starting the actual boring process, but it can also be used to detect deformations on the robot side. In principle, it is possible to carry out just the pressing operation of the articulated-arm robot against the workpiece at any boring position before proceeding with the actual boring in order to capture possible positioning errors. However, this entails an additional expenditure of time when carrying out the entire borehole drilling task.

It is also possible to detect a possible positioning error by bringing the connector of the articulated-arm robot to bear on the region of the boreholes just once under load force before carrying out a certain number of drilling processes which are to be completed at different boring locations and are all located in close proximity to each other on the surface of the workpiece. Then, the number of drilling processes may be carried out without interruption taking into account the positioning error determined once in advance and an orientation correction derived therefrom. For the purposes of boring, after the detachable mechanical connection has been established on the workpiece surface, the boring tool is activated and moved towards the workpiece under process monitoring. In general, drilling, milling, cutting, grinding or other abrasive machining operations may also be carried out on the workpiece surface.

In the following text, the performance of high-precision boring will be explained, in which a drill is used and moved towards the workpiece by a numerically controlled (NC) advance unit attached to an end of the articulated-arm robot. The process-monitored drilling procedure is stopped as soon as the predetermined borehole depth has been reached.

BRIEF DESCRIPTION OF THE INVENTION

In the following, the invention will be described for exemplary without limitation of the general inventive thought using embodiments and with reference to the drawing. In the drawing:

FIG. 1 shows an arrangement for introducing boreholes into a ship's propeller;

FIGS. 2a, b and c show views from various positions of a drilling spindle arrangement attached to the end of the kinematic chain of the articulated-arm robot, with a connector unit that serves to create a mechanical connection with the workpiece;

FIG. 3 shows a ship's propeller under the effects of force;

FIGS. 4a and b show ships' propellers under no load during machining;

DETAILED DESCRIPTION OF THE INVENTION

Figure 1:
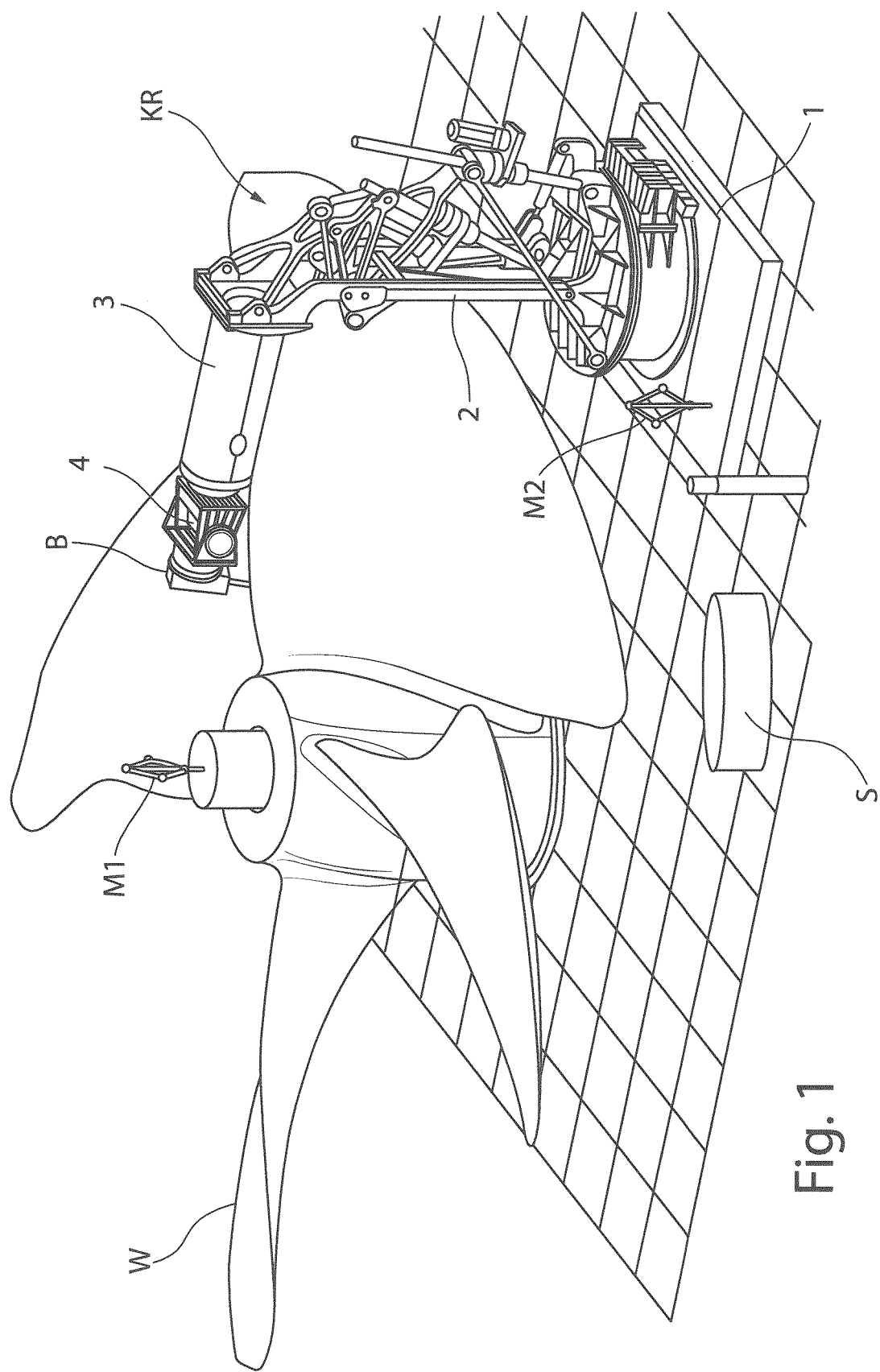

FIG. 1 shows a workpiece W in the form of a ship's propeller that is to be machined, which is to be provided with boreholes at certain predefined machining locations. Due to its size and the surface of workpiece W, which consists mainly of freeform surfaces, the only apparatus suitable for post-machining the workpiece is a large-scale, vertical articulated-arm robot KR with a boring arrangement B attached to the end face of the kinematic chain thereof, which has two arm members 2 and 3. Articulated-arm robot KR, which is described in full detail in document DE 10 2013 018 857 A1, is equipped with a robot arm which is secured to a base 1 that is rotatable about the vertical axis. The robot arm has two arm members 2 and 3 arranged one after the other in the manner of a kinematic chain, with which the first arm member 2 is mounted on base 1 to pivot about a second axis aligned orthogonally to the vertical axis. The second arm member 3 is attached to the first arm member 1 to pivot about a third axis, which is aligned parallel to the second axis. An in-line wrist 4 is attached to one end of the kinematic chain, on the terminal end of the second arm member 3, and boring arrangement B is attached to the wrist by a support frame which will be described in greater detail in the following text. For the purpose of explaining the other components of articulated-arm robot KR, reference is made to the disclosure content of the document cited previously. It is equally possible to attach a further arm member—not shown—to in-line wrist 4 instead of boring arrangement B. The further arm member is preferably equipped with a telescopic extension mechanism and is thus able to be extended to an arm length as needed. Boring arrangement B may be installed on the end of this additional telescopic arm member.

Arm members 2 and 3 of the vertical articulated-arm robot KR may each have arm lengths between 2.5 and 3.5 meters. This illustrates the ample working range that articulated-arm robot KR can reach, so that workpiece W with structural heights of several meters can undergo a surface machining operation with the aid of tool attached to the end of articulated-arm robot KR without the need to move workpiece W itself.

In order to carry out the surface machining, first it is necessary to capture the spatial arrangement of the workpiece W to be machined and of articulated-arm robot KR, particularly the tool attached to the end of articulated-arm robot KR, which is a boring arrangement B in the example. For this purpose, a spatially resolving object detection system, which functions without contact, is provided, in the form of a laser tracker LT, for example. With the aid of a marking M1 which is suitably attached and formed on workpiece W, laser tracker LT is able to compile a workpiece coordinate system WKS that defines the spatial orientation of workpiece W. In the same way, laser tracker LT is able to generate a robot coordinate system RKS that can be assigned to the articulated-arm robot with the aid of a marking M2 which is applied permanently to the articulated-arm robot KR, which system can also be used to determine the spatial orientation of the boring arrangement B which is fastened to articulated-arm robot KR.

The workpiece coordinate system and the robot coordinate system compiled by laser tracker LT are forwarded to a control unit S, in which the two coordinate systems are correlated with each other.

By specifying spatial coordinates that define a machining location on the workpiece surface of workpiece W where a borehole is to be made, articulated-arm robot KR positions the boring arrangement B attached to it in a spatial position opposite and at a predetermined distance from the predetermined machining location on the workpiece surface. The positioning operation takes place very rapidly with the aid of the articulated-arm robot kinematics. When positioning is complete, the current spatial position of boring arrangement B, in particular the spatial position of a center of gravity of the boring tool is detected and checked with the aid of laser tracker LT. In the event that a deviation from a predetermined target position is detected, articulated-arm robot KR carries out a post-adjustment accordingly. The post-adjustment operation may be repeated multiple times until the exact spatial position is reached.

When boring arrangement B is in a correct spatial position, which is opposite the machining location on the workpiece surface, a measurement scan is made of both the distance between boring arrangement B and the workpiece surface and of the orientation and spatial alignment of the workpiece surface at the machining location relative to boring arrangement B.

For this purpose, preferably three separate laser distance sensors are attached around and/or on boring arrangement B. On the basis of the distance values detected with the laser distance sensors, it is possible to align the longitudinal axis of the drill exactly orthogonally to the workpiece surface at the machining location.

Figure 2A:
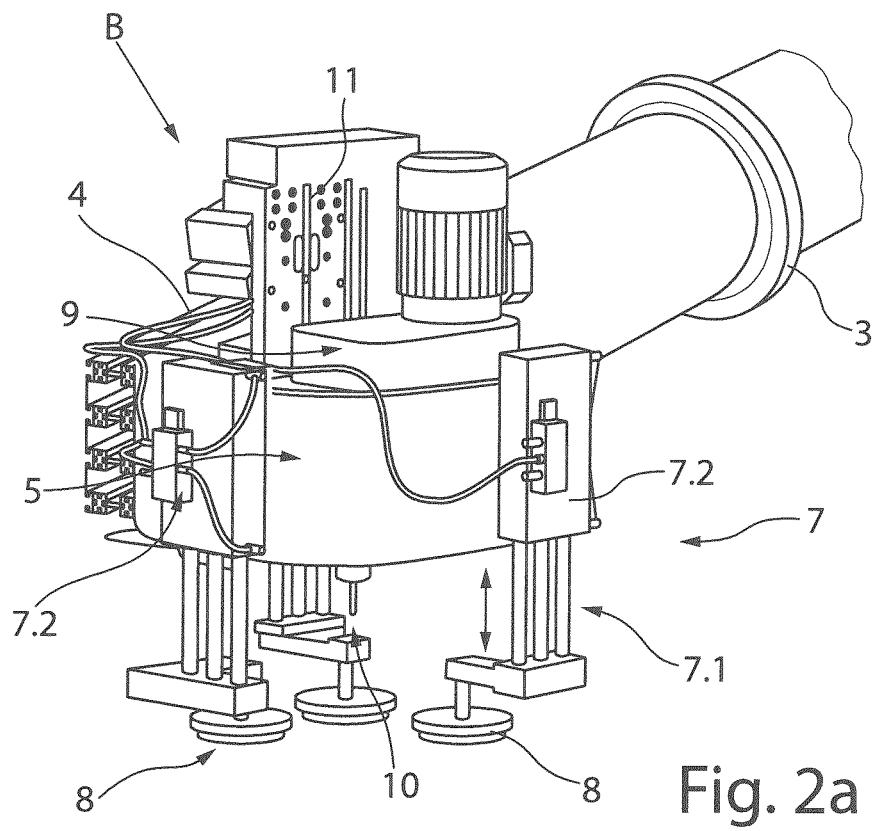
Figure 2B:
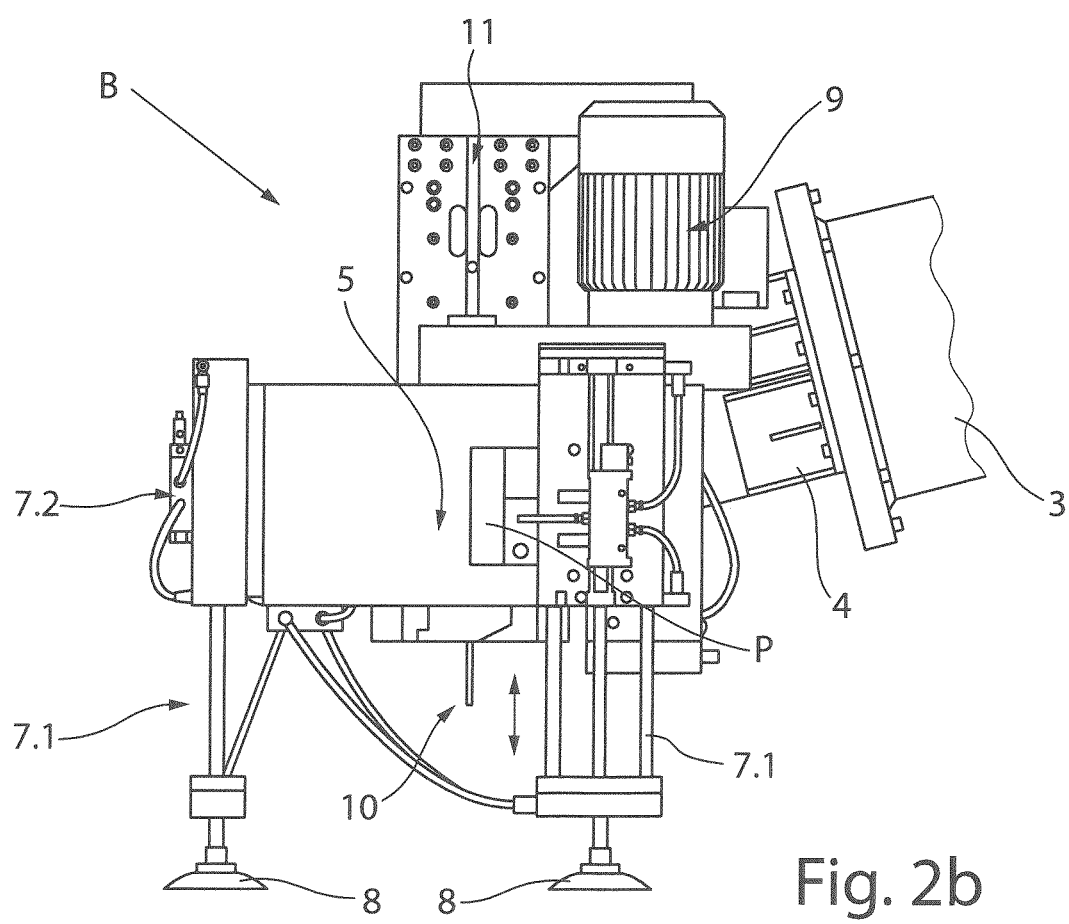
Figure 2C:
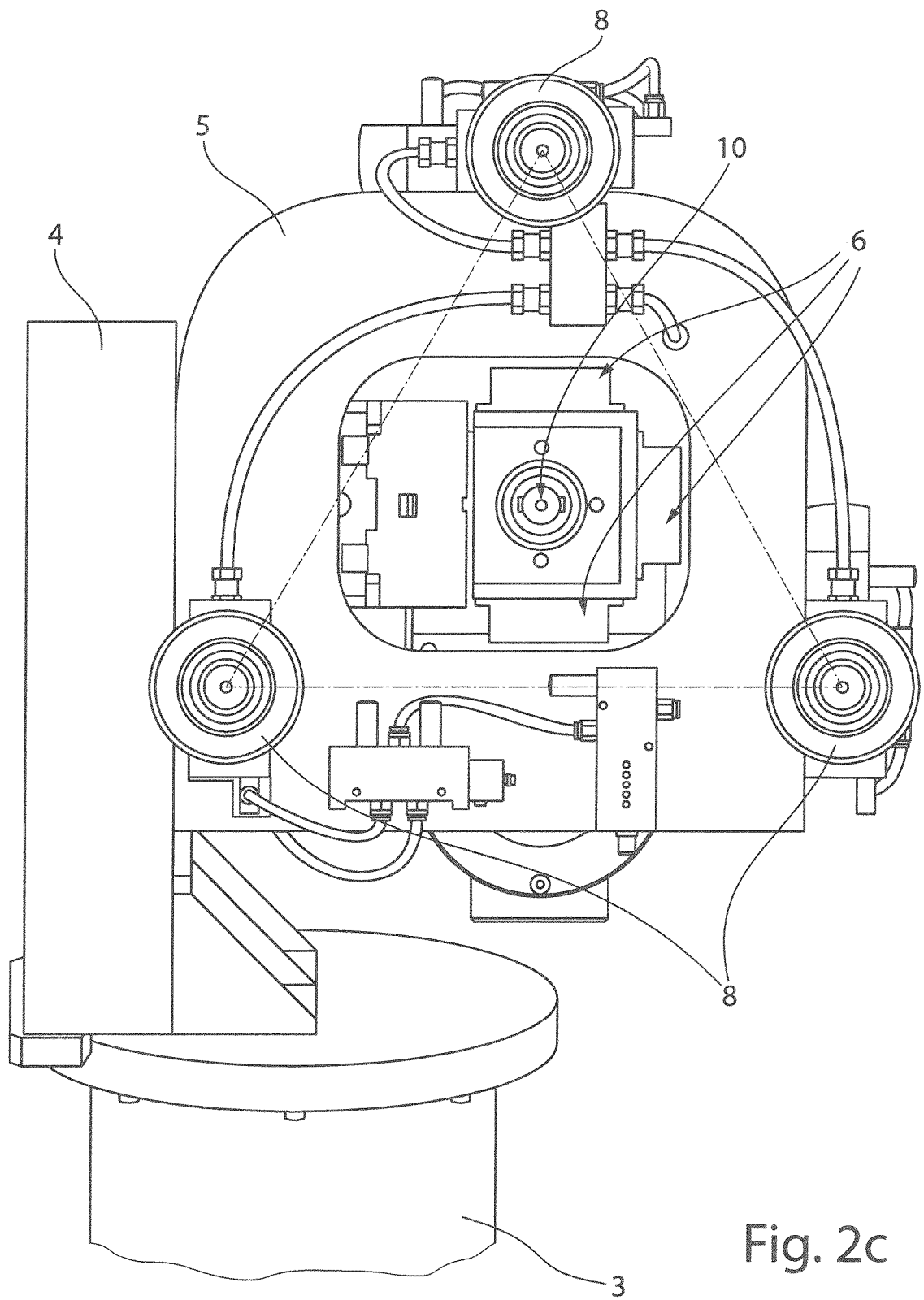

In order to illustrate the Z boring arrangement B attached to the to in-line wrist 4 of articulated-arm robot KR, the following text will refer to FIGS. 2a to c, which show boring arrangement B from various points of view. FIGS. 2a and b show boring arrangement B in two different side views, FIG. 2c represents boring arrangement B axially with the longitudinal axis of the drill from below. The following text apply equally to all three FIGS. 2a to 2c.

A support frame 5 is arranged permanently on the in-line wrist 4 provided at the end of second arm member 3, to which a plurality of components necessary for the drilling operation are attached. Among other items, three laser distance sensors 6 are indirectly but permanently connected to support frame 5 and these are able to detect the spatial orientation of support frame 5 and its distance from the workpiece surface.

After boring arrangement B has taken up the correct orientation opposite W in its spatial position with process monitoring, a connector unit attached to support frame 5 is activated to create a mechanical connection between support frame 5 and workpiece W.

In the embodiment illustrated in FIGS. 2a to c, the connector unit includes three linear actuators 7, which are attached to support frame 5, and all of which are equipped with a telescopic, i.e. length varying mechanism, which can be driven by electromotive, hydraulic or pneumatic power. In the case of the embodiment shown in FIGS. 2a to c, each individual linear actuator 7 has a pneumatic lifting cylinder. Each pneumatic cylinder 7.1 can be varied in length by a valve-controlled pneumatic unit 7.2 (See the double-headed arrows illustrated in FIGS. 2a and b).

Locks 8 are attached to the ends of pneumatic cylinders 7.1 farthest from support frame 5 and all are designed to be operated pneumatically as vacuum suction grippers by application underpressure. The vacuum suction grippers are preferably connected to the ends of pneumatic cylinders 7.1 with ball-and-socket joints, so that they are thus able to assume the correct contact orientation automatically when they contact a surface. The three linear actuators 7 are also arranged about the centrally disposed boring tool 10 so that boring tool 10 lies in an area of a centroid of an equilateral triangle that extends through the linear actuators 7, are represented by dash-dotted lines in FIG. 2c.

In order to create a mechanical connection between second arm member 3 of kinematic robot KR and workpiece W, pneumatic cylinders 7.1 are extended in very small increments, individually and independently of each other until it locks 8, in the form of vacuum suction grippers, touch the workpiece surface. To do this, pneumatic cylinders for 7.1 are extended using proportional valves with low overpressure provided on pneumatic unit 7.2 until the vacuum grippers—which are already under suction—touch the workpiece surface and fasten themselves to the surface. This prevents boring arrangement B from drifting due to the different rigidities that exist in the system of the articulated-arm robot KR.

Then, the mechanical contact pressure with which locks 8 adhere to the workpiece surface is increased. For this, a higher pressure is set via the proportional valves P provided on pneumatic units 7.2, so that support frame 5 and all components that are firmly connected thereto are clamped between the workpiece and the kinematic chain of articulated-arm robot KR.

In the next step, pneumatic cylinders 7.1 are blocked so that they can only function as biased springs. At this point, the entire kinematic chain of articulated-arm robot KR and therewith also support frame 5 including all components fastened to one side thereof is braced against the workpiece surface in a firm adhesive connection wherein the one-sided clamping constitutes an elastically resilient mounting, so that vibrations and oscillations caused by the machining process that might be transferred to kinematic chain are damped.

In a further step, the approximate distance between laser distance sensors 6 and the workpiece surface is measured.

Boring arrangement B, which is connected firmly to support frame 5, comprises a spindle drill 9 which drives drill bit 10. Drill bit 10 is moved over the workpiece surface as rapidly as possible and as close as possible to the workpiece surface with the aid of a NC-advance unit 11. Now the drill feed follows until a surface contact is established between drill bit 10 and the workpiece surface at the machining location. Drill bit 10 is driven into the workpiece with process monitoring at a correspondingly predetermined rotating speed and advance speed until a previously specified borehole depth has been reached. Process monitoring is assured with sensors, for example by detecting the effective power at the motor of NC advance unit 11 and/or of spindle drill 9, or with the aid of suitably attached acceleration sensors or force sensors. The distance sensors 6 attached firmly to support frame 5 also detect the distance between support frame 5 and the workpiece surface during the drilling operation in order to keep it constant. If the advance of the drill causes support frame 5 to recoil this is captured with laser distance sensors 6 and can be compensated directly.

It is also possible to detect breakage of a drill bit with the abovementioned monitoring parameters, so that the drilling process can be stopped promptly.

When the desired borehole depth has been reached, drill bit 10 is retraced with the aid of numerically controlled advance unit 11, and vacuum suction cups 8 are released from the workpiece surface. Articulated-arm robot KR immediately moves boring arrangement B to a new spatial position located opposite another machining location on the workpiece surface.

Figure 3:
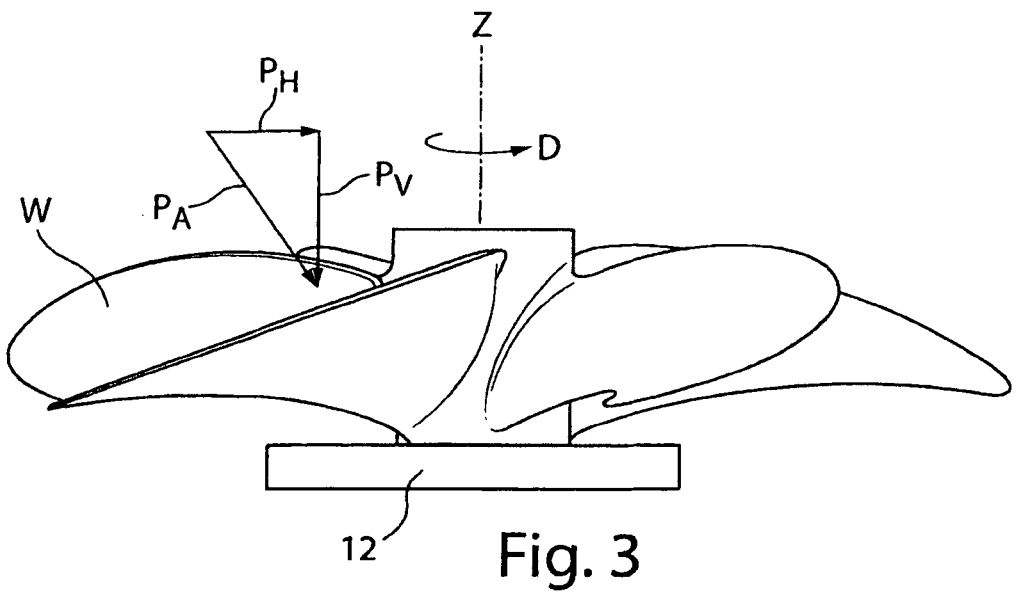

FIG. 3 illustrates a side view of workpiece W represented in FIG. 1 having the form of a ship's propeller, which is mounted on a motor-driven rotating platform 12 to enable a controlled rotation about vertical axis Z and a consequently possible alignment of the ship's propellers relative to the laterally arranged articulated-arm robot KR (not shown in FIG. 3). For example, if it is necessary to introduce boreholes into the surface of the ship's propeller that is accessible vertically from above, boring arrangement B is positioned above the borehole position and pneumatic cylinders 7.1 extend orthogonally to the surface of the propeller blade and contact it with vacuum suction cups 8. see FIGS. 2a and 2b. In this process, a pressing force $P_A$ exerted orthogonally to the propeller surface is generated, having a vertical force $P_V$ and a horizontal force $P_H$ acting on the ship's propeller. Due to the inclined position of the propeller blade, particularly the horizontal force $P_H$ gives rise to a torque D about vertical axis Z, which may cause the ship's propeller to turn due to a possible bearing clearance in rotating platform 12, The direction of rotation and also the magnitude of the torque are determined not only by the pressing force $P_A$ that must be applied by the articulated-arm robot but also by the location and the inclination of the propeller blade.

The coordinates of the boring positions are generally known and are present as point coordinate sets in the workpiece coordinate system WKS explained earlier, wherein workpiece coordinate system WKS has been recorded by laser tracker LT on workpiece W under no load. As long as the workpiece does not undergo any change in orientation during machining, the control unit that actuates the articulated-arm robot enables extremely accurate positioning of the boring tool relative to the boring position.

Figures 4A, 4B:
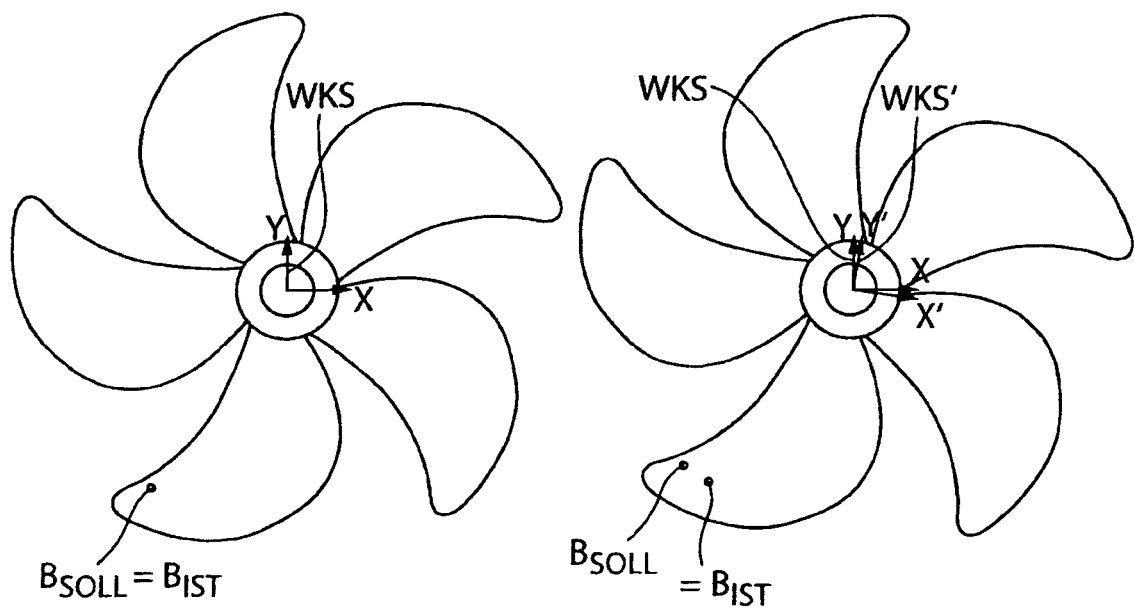

If the orientation of the ship's propeller changes as a result of the machining activity or because it turns about vertical axis Z as described earlier, workpiece coordinate system WKS' changes, so that the known coordinates of the boring positions now no longer match the workpiece coordinate system WKS' reflecting the changed orientation. This is represented in FIGS. 4a and b. In FIG. 4a, the target and actual borehole coordinates $B_{soll}$, $B_{ist}$ in workpiece coordinate system WKS are identical. In FIG. 4b, the target and actual borehole coordinates $B_{soll}$, $B_{ist}$ are no longer identical because the ship's propeller has turned since the original workpiece coordinate system WKS is transformed into the new workpiece coordinate system WKS' under the pressing force of the articulated-arm robot.

To correct this faulty positioning, the workpiece coordinate system is measured and defined in a state in which the articulated-arm robot is pressing against the surface of the ship's propeller. The known borehole coordinates, which are obtained from a CAD system, for example, may be used on the basis of the currently received workpiece coordinate system.

The process of calibrating the workpiece coordinate system may be carried out once or before every single drilling operation, in each case by pressing the boring arrangement against the respective current boring position. In this way, errors due to a change in orientation are eliminated entirely.

When the positioning operation described previously is completed, it has been found that undesirable inaccuracies can still occur during the drilling process in terms of the achievable intended borehole depth, the target borehole depth, particularly with uneven workpiece surfaces. This inaccuracy when drilling on uneven workpiece surfaces may be remedied with a preferred boring strategy, which will be explained with reference to FIGS. 5 to 8.

Figure 5:
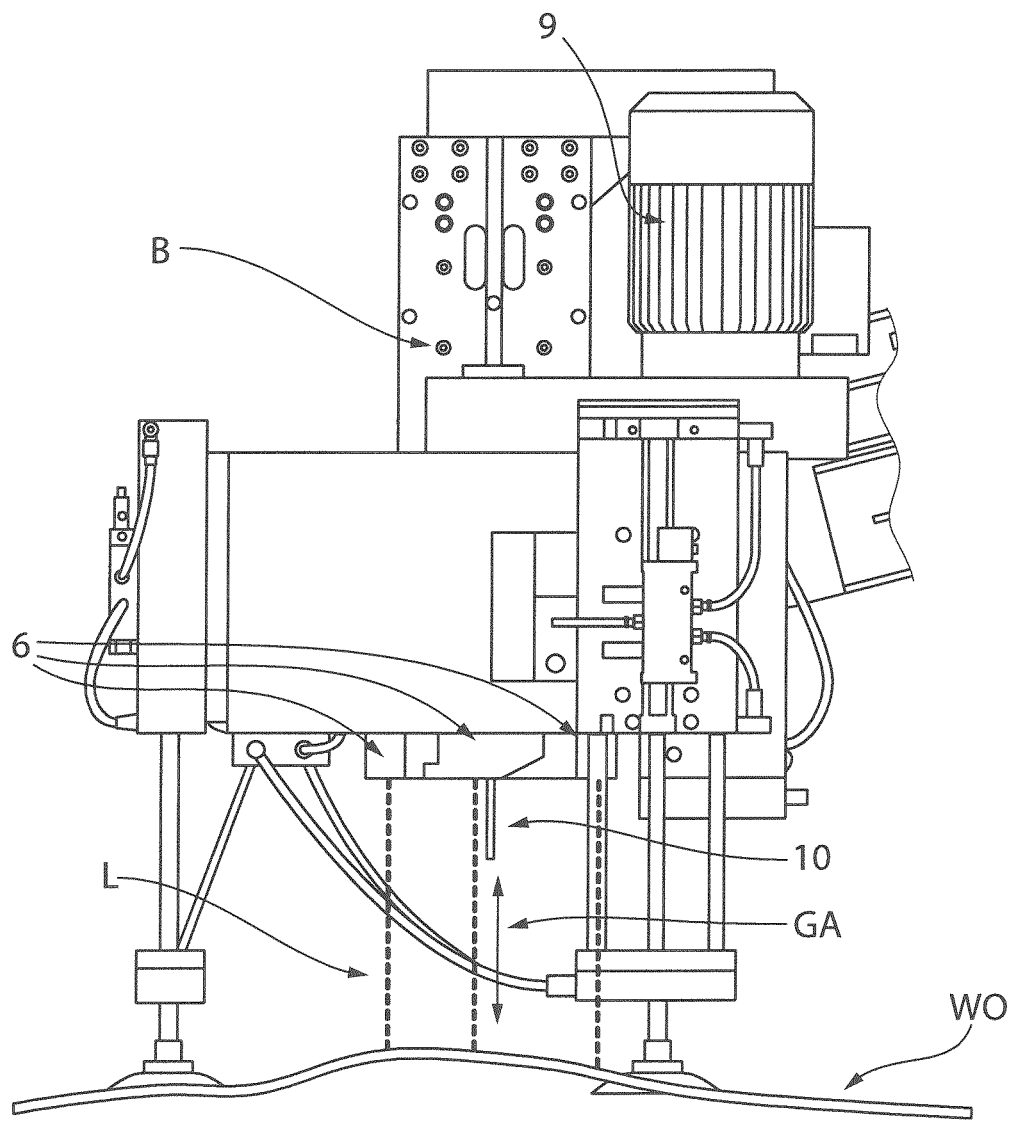
FIG. 5 shows boring arrangement positioned on the workpiece surface.
Figure 6:
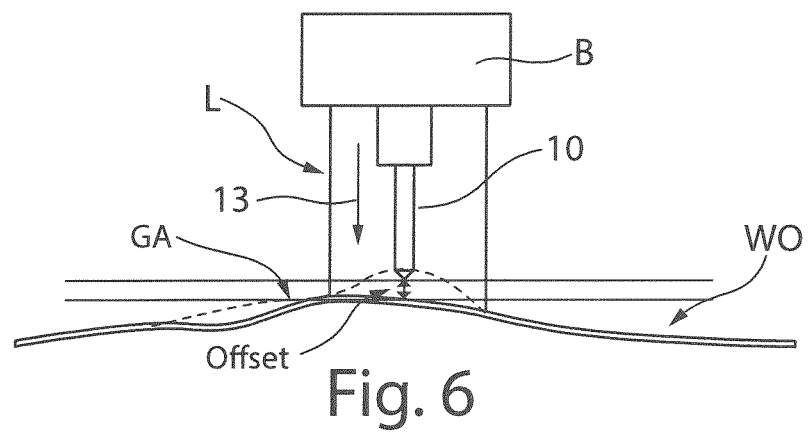
FIGS. 6-8 shows an approach procedure of the boring tool to the workpiece surface.
Figure 7:
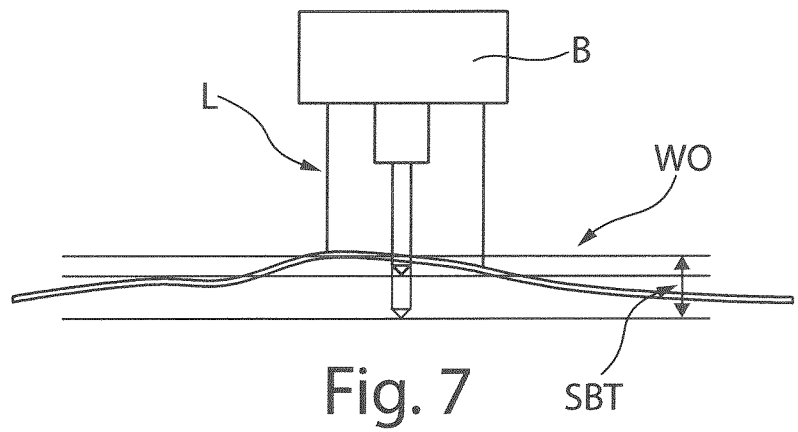
Figure 8:
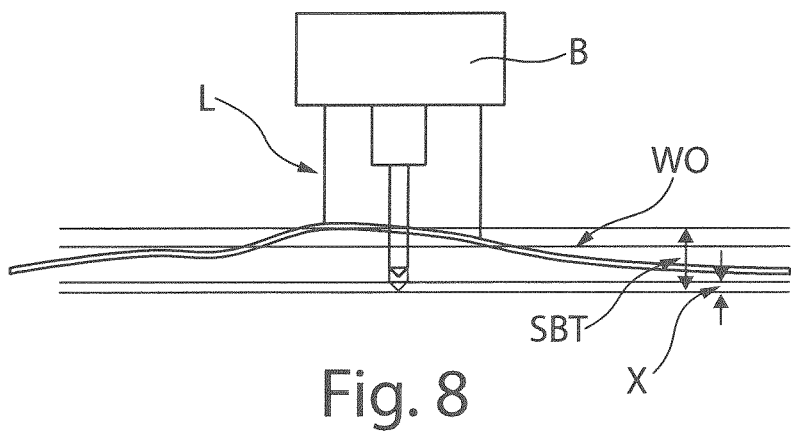

FIG. 5 represents a boring arrangement B positioned exactly on workpiece surface WO. The spindle drill 9 which causes boring tool 10 to rotate is activated and NC advance unit 11 advances rapidly (200 mm/s) as far as about 10 mm over workpiece surface WO. Since the exact nature of workpiece surface WO is not completely known, uncertainty exists here. For example, it is quite conceivable that workpiece surface WO has a local elevation E. If this is greater than for example 10 mm, boring tool 10 may break if boring tool 10 collides with the workpiece surface WO at such a high speed.

To address this problem, the distance from workpiece surface WO is measured with the three laser distance sensors 6 on boring arrangement B. See FIG. 6. Since the curvature of the surface is also not know, an estimated value, for example 10 mm is used as an offset. All three sensors measure a distance from the workpiece surface WO with a laser beam L. Then, a plausibility check is carried out and if this is completed successfully, an average is formed from the three measured distance values. The offset is deducted from the average distance value GA to take into account a possible surface curvature, so that a first travel segment 13 is obtained, along which boring tool 10 is moved rapidly at a travel speed of 200 mm/s, for example. As boring tool 10 approaches the region of the offset, corresponding to a second travel segment, boring tool 10 is only advanced at a usual drill advance speed of about 6 mm/s. The strategy of splitting the averaged distance into two segments is significant for both industrial safety and business reasons in order to achieve the shortest drilling process possible because the longer boring tool 10 travels at a reduced drilling advance speed (only about 6 mm/s) the longer the process takes as a whole. For example, if boring tool 10 were to travel over the entire first segment, 24 mm for example, at a speed of just 6 mm/s, each borehole would take seconds longer to create than in the case explained earlier. With 1000 boreholes, this time difference is already more than a whole hour.

Within the offset region, boring tool 10 advances at a drill advance speed until boring tool 10 makes contact with workpiece surface WO. This initial contact is monitored via the electrical effective power of spindle drill 9. If the effective power rises above a characteristic threshold value, the section is considered to be recognized. In this case, a digital signal is forwarded to the controller. This signal has the effect of "zeroing" setting all three laser distance sensors 6, so that afterwards only the penetration by boring tool 10 into workpiece W is measured, see FIG. 7. When the desired bore depth SBT less a travel path X required for decelerating the advance to zero is reached, the advance is first slowed to a complete standstill and then accelerated in the withdrawal direction.

With the method according to the invention and the associated arrangement according to the invention for machining the surface of a workpiece mounted in stationary manner, it is possible to drill boreholes with very high accuracy on any curved workpiece surfaces and to do to this almost completely independently of the rigidity and absolute accuracy of the articulated-arm robot system. Moreover, the introduction of boreholes into a workpiece according to the invention as described above, the articulated-arm robot may also be fitted with milling, grinding or cutting tools. Furthermore, joining operations such as screwing, riveting, welding or bonding operations may be carried out with great accuracy on workpieces using the working method described in the preceding text.

LIST OF REFERENCE SIGNS

1 Robot base
2 First arm member
3 Second arm member
4 In-line wrist
5 Support frame
6 Laser distance sensors
7 Connector unit, linear actuator
7.1 Pneumatic cylinder
7.2 Pneumatic unit
8 Locking means
9 Spindle drill
10 Drill bit
11 Numerically controlled advance unit
12 Rotating platform
13 First spacing
D Torque
Z Vertical axis
A2 Second axis
B Boring arrangement
KR Articulated-arm robot
GA Averaged spacing value
M1 Marking
M2 Marking
S Control unit
W Workpiece
WO Workpiece surface
LT Laser tracker
L Laser beam
P Proportional valve
$P_A$ Pressing force
$P_H$ Horizontal force
$P_V$ Vertical force
SBT Reference borehole depth
WKS, Workpiece coordinate system
WKS'
X Deceleration path

The invention claimed is:

1. A method of boring holes into a workpiece while mounted in a stationary position by a boring tool attached to an end face of an articulated-arm robot, comprising:
   positioning the articulated-arm robot at a position spaced a distance from a machining location on a workpiece surface;
   providing a rigid mechanical connection between the articulated-arm robot and the workpiece surface to support the workpiece under load and which can release the workpiece surface from the load by activating at least three actuators attached to the end face of the articulated-arm robot which are separately actuatable in increments to contact the workpiece surface to apply the load or release the workpiece from the load, the articulated-arm robot operating being positioned to apply the load by contact with the workpiece when the boring tool is boring a hole in the workpiece or to release the workpiece from load;
   boring the hole in the workpiece surface by moving the boring tool towards the machining location on the workpiece and subsequentially engaging the boring tool with the workpiece surface at the machining location while the actuators of the articulated-arm robot are connected to the workpiece surface to apply the load thereto;
   moving the boring tool towards the workpiece surface under control of a numerically controlled advance unit attached to an end of the articulated-arm robot;
   monitoring the boring of the hole in the workpiece surface based on information obtained from a sensor system which detects a position of the boring tool during boring of the workpiece surface and which is attached to the end face of the articulated-arm robot;
   terminating the boring process upon reaching a specified boring depth;
   positioning the boring tool before boring based on binary data which describes a spatial shape of the workpiece to be machined, a predetermined machining location of the workpiece surface, a center point of the tool, and a spatial position of the boring tool; and
   generating at least one of a workpiece coordinate system and a robot coordinate system when the load is applied to the workpiece by the actuators before starting of the boring and then at least one of the coordinate systems are used to control the boring by the boring tool while the load is applied by the actuators.

2. The method in accordance with claim 1 comprising positioning the boring tool in a spatial position opposite to and at a predetermined distance from the machining location on the workpiece to cause the boring of the hole in the workpiece.

3. The method in accordance with claim 1 comprising checking for a corrected spatial location at which the boring tool is to be moved to continue of the hole and positioning the boring tool at the corrected spatial location to perform boring of the hole at the corrected spatial location.

4. The method in accordance with claim 2 comprising checking for a corrected spatial location at which the boring tool is to be moved to continue the boring and positioning the boring tool at the corrected spatial location to perform to continue the boring of the hole at the corrected spatial location.

5. The method in accordance with claim 1 comprising absorbing forces and moments along the articulated-arm robot by rigid mechanical connection of the articulated arm to the workpiece surface.

6. The method in accordance with claim 5 wherein the rigid connection is created by at least one of a magnetic, pneumatic or frictional force between the workpiece surface and the articulated-arm robot.

7. The method in accordance with claim 1 wherein at least one linear actuator is attached to the end face of the articulated-arm robot and the at least one linear actuator is activated to produce the rigid mechanical connection between the workpiece surface and the boring tool and the articulated-arm robot causes the boring tool to contact the workpiece surface and bore the hole.

8. The method in accordance with claim 1 at least one of borehole depth and spatial orientation of the boring tool relative to the workpiece surface at the machining location is determined by the sensor system attached to the end face of the robot.

9. The method in accordance with claim 1 wherein the connection of the articulated-arm robot to the workpiece surface supports the end face, the connection is removed and the articulated-arm robot is moved a distance which is split into at least two sections with a first section being closest to the articulated-arm robot and a second distance being closest to the workpiece surface and the boring tool is moved towards the workpiece surface along the first section at a greater advance speed than along the second section under control of a numerically controlled advance unit attached to the end face.

10. The method in accordance with claim 9 wherein the boring tool is moved along the first and second sections by the numerically controlled advance unit with the boring tool travelling at least along the second section while the boring tool is rotated by a spindle drill and electrical power drawn the spindle drill is measured to detect a first contact between the boring tool and the workpiece surface.

11. The method in accordance with claim 10 comprising:
generating a signal with the sensing system when the boring tool first contacts the workpiece which resets a distance that has been traveled;
detecting a depth of the borehole travel in response to the generated signal;
stopping advancing of the boring tool at a set distance before a target borehole depth is reached; and
the set distance of travel corresponds to a distance required for the boring tool to travelling forward upon reaching the set distance from the boring tool to stop rotation to reach the target borehole depth when rotation stops.

12. A system for drilling boreholes into a workpiece surface at a location on a stationary workpiece by a boring tool attached to an end of an articulated-arm robot comprising:
a control system for spatially positioning and orienting the boring tool relative to a boring location on the workpiece surface;
a sensor system attached to the end of the articulated-arm robot which detects a distance between the end of the articulated-arm robot and the boring location on the workpiece surface;
a rigid detachable mechanical connection attached to the end of the robot arm which supports the robot relative to the workpiece surface having at least three linear actuators attached thereto to an end of the robot arm with the actuators being separately moveable in increments and an actuator mechanism which moves the articulated-arm robot under control of a numerically controlled advance unit attached to the end of the robot arm; and wherein
the control system positions the boring tool based on binary data describing a spatial shape of the workpiece to be bored, a predetermined machining location of the workpiece, a center point of the boring tool and a detected relative position of the boring tool, and generates at least one of a robot coordinate system and workpiece coordinate system when the load is applied to the workpiece by the actuators before starting the boring and when the robot is connected with the workpiece during application of the load to the workpiece with the articulated-arm robot during boring of the hole by the boring tool;
the control system monitors the boring of the workpiece based on information obtained by the sensor system which detects a position of the boring tool relative to the workpiece surface and terminates the boring process upon reaching a specified boring depth;
wherein the articulated-arm robot has a horizontal and vertical operating range of a minimum of 5 meters.

13. The system in accordance with claim 12 wherein the control comprises:
a contactless tracking system including the sensor system which generates the at least one coordinate system describing a spatial location of the workpiece surface and the robot coordinate system describing a spatial location of the articulated-arm robot.

14. The system in accordance with claim 12 wherein the at least one linear actuator is connected to one end of a support frame and has an actuator end connected at a location disposed farthest from the support frame to which a lock is attached for forming a detachable rigid connect to the surface of the workpiece.

15. The system in accordance with claim 12 wherein the lock generates at least one of a magnetic and a suction force applied to the workpiece surface.

16. The system in accordance with claim 14 wherein at least one of the linear actuators is a pneumatic cylinder including a vacuum gripper which is attached to an end of a pneumatic cylinder located farthest form the support frame.

17. The system in accordance with claim 14 wherein the sensor system comprises at least three laser distance sensors attached to the support frame.

18. The system in accordance with claim 14 wherein the sensor system senses distance by at least three laser distance sensors attached to the support frame.

19. The system in accordance with claim 12 wherein the actuator mechanism includes a drill spindle and a numerically controlled advance axis feed and the actuator mechanism includes the at least one sensor system which measures at least one of effective power, acceleration, and the force applied by the actuator mechanism.

20. The system in accordance with claim 12 wherein the workpiece is mounted to rotate relative to the to the articulated-arm robot.

* * * * *